United States Patent [19]

Abe

[11] Patent Number: 4,926,836
[45] Date of Patent: May 22, 1990

[54] METHOD OF AND APPARATUS FOR DRESSING CUTTING EDGE OF CUT-OFF WHEEL

[75] Inventor: Seiichi Abe, Sodegaura, Japan

[73] Assignee: Mitsubishi Kinzoku Kabushiki Kaisha, Tokyo, Japan

[21] Appl. No.: 181,202

[22] Filed: Apr. 13, 1988

[30] Foreign Application Priority Data

Jul. 31, 1987 [JP] Japan ............................ 62-192478

[51] Int. Cl.⁵ .............................................. B24B 53/00
[52] U.S. Cl. .................... 125/11.01; 125/11.03; 51/325
[58] Field of Search ............... 51/5 D, 325, 246, 247, 51/288; 125/11 R, 11 CD, 11 AT, 11.6 A, 11.06; 83/174, 174.1

[56]  References Cited

U.S. PATENT DOCUMENTS

| 928,755 | 7/1909 | Henderson | 51/247 |
| 1,526,496 | 2/1925 | Hohnhorst et al. | 125/11 CD |
| 2,728,176 | 12/1955 | Ritzert | 51/246 |
| 3,553,893 | 1/1971 | Stade | 125/11 GA X |
| 3,736,825 | 6/1973 | Covell | 83/174 |
| 3,747,584 | 7/1973 | Kikuchi | 125/11 CD |
| 4,051,830 | 10/1977 | Gruber | 125/11 R |
| 4,699,118 | 10/1987 | Tsuruta et al. | 125/11 R |

FOREIGN PATENT DOCUMENTS 214792 10/1984 German Democratic Rep. .... 125/11 CD
61-243344 4/1988 Japan .
61-243345 4/1988 Japan .

Primary Examiner—Robert P. Olszewski
Attorney, Agent, or Firm—Scully, Scott, Murphy & Presser

[57]  ABSTRACT

A dressing apparatus includes: a first body extending parallel to the axis of the cut-off wheel, the first body having a slider member slidable along the longitudinal axis of the first body, the slider member being urged by an urging member so as to be normally retained in an initial position thereof; a second body, slidably connected to the slider member, for movement in a direction perpendicular to both the cut-off wheel's axis and the first body's axis; a drive motor for rotating a pair of grinding wheels connected to the head member, the axes of the grinding wheels being perpendicular to a plane parallel to both the cut-off wheel's axis and the first body's axis, a line which is perpendicular to both of the axes of the grinding wheels being parallel to the first body's axis; and a drive mechanism, interposed between the first and second bodies, for moving the second body so that either of the grinding wheels is brought into contact with the peripheral cutting edge formed on the cut-off wheel to apply a dressing to the peripheral cutting edge. The drive mechanism includes: a cylinder actuator for moving the slider member from its initial position in either of the opposite directions; and a mechanism for causing the second body to move in a direction relative to the slider member simultaneously with the movement of the slider member from its initial position.

6 Claims, 8 Drawing Sheets

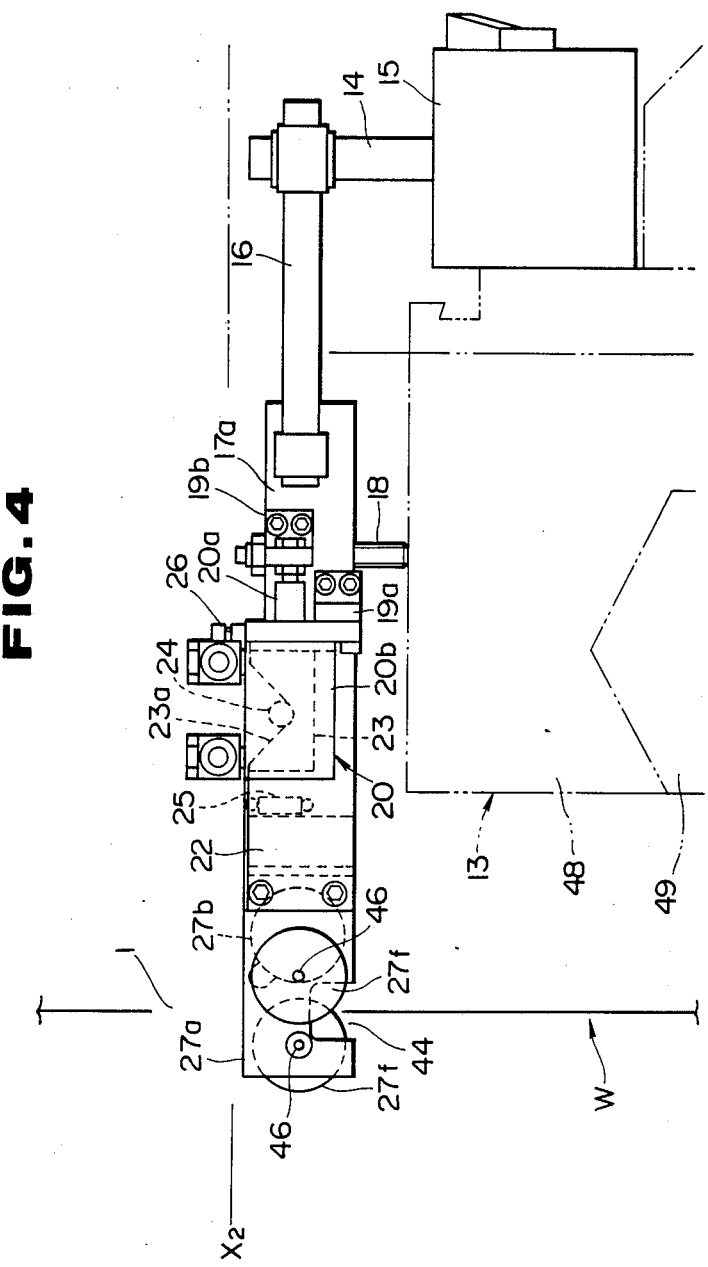

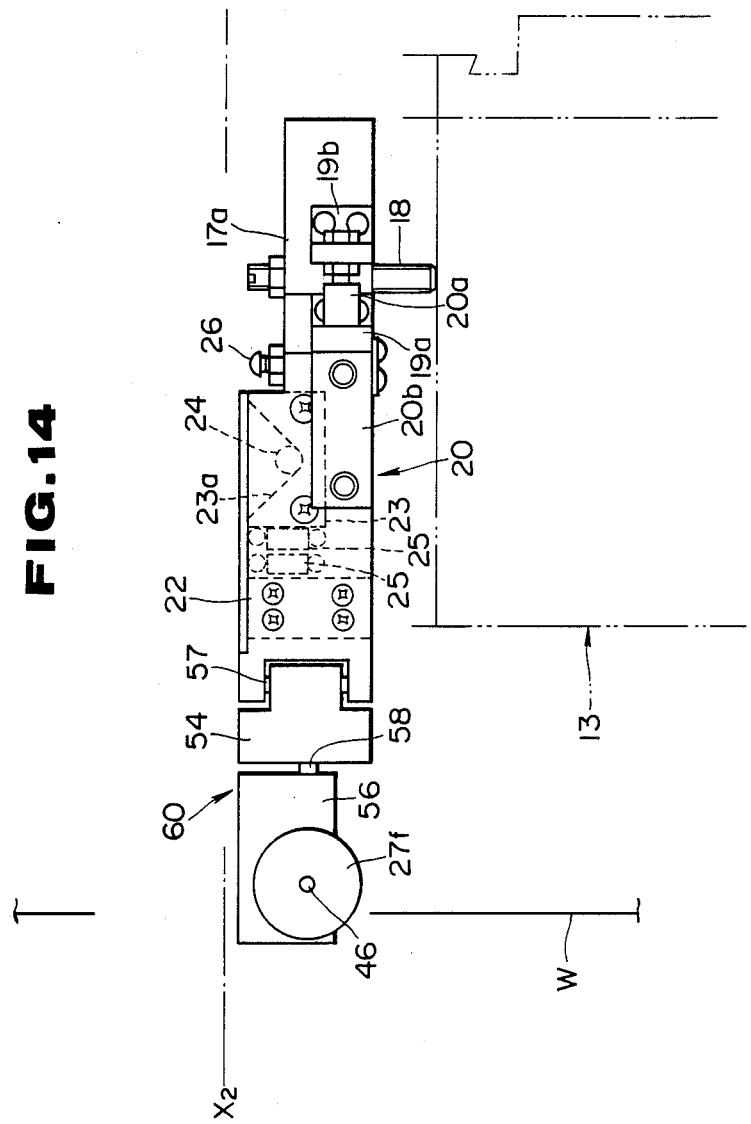

METHOD OF AND APPARATUS FOR DRESSING CUTTING EDGE OF CUT-OFF WHEEL

BACKGROUND OF THE INVENTION

This invention relates to a method of and an apparatus for dressing the cutting edge of a cut-off wheel which is used, for example, for cutting an ingot of semiconductor material into semiconductor wafers.

In the cutting of a block of semiconductor material such as a silicon ingot into slices to produce semiconductor wafers, a cut-off wheel having an inner peripheral cutting edge is generally utilized. As shown in FIG. 1, this cut-off wheel W is of a disc-like configuration and has an aperture 1 formed at the center thereof. An inner peripheral cutting edge 2 which comprises an electrically deposited diamond-grain coating and the like, is formed along the entire inner peripheral portion of the wheel W. The cut-off wheel W is secured to a rotary cutting machine by means of attaching holes 3 circumferentially disposed in the outer peripheral portion of the wheel W and is rotated at a high speed by the cutting machine to cause the inner peripheral cutting edge 2 to cut, into slices, a silicon ingot 4 which is inserted into the aperture 1 and moved in a direction parallel to the cut-off wheel W, as indicated by arrow A.

The sharpness of such cut-off wheel decreases as the cutting operation is repeated since the cutting edge 2 is worn down and the pores on the surface of the cutting edge 2 become clogged with a powdery substance. This decrease in sharpness causes a variation in thickness and a warp or curvature of the cut slices of the ingot, which results in a deterioration in quality of the semiconductor wafers. For this reason, it is necessary for the cut-off wheel to be occasionally applied with a dressing treatment to remove the powdery substance from the pores and to resharpen the cutting edge.

Conventional dressing treatment is applied to the cut-off wheel, for example, according to the manner of manual dressing. In the manual dressing, an abrasive stick 5, as shown in FIG. 2, is brought into slight contact with a dulled portion of the cutting edge 2 of a rotating cut-off wheel W and is slid in a direction indicated by arrow B to dress the cutting edge 2 gradually. However, a great skill is required for continuously effective dressing, since it is difficult for the abrasive stick to maintain a proper state of contact with the cutting edge 2 and since inadequate pressing of the abrasive stick against the cutting edge causes, on the cutting edge 2, such damage that the diamond grains fall off.

U.S. Pat. No. 4,699,118 discloses a dressing apparatus for automatically applying a dressing to the cutting edges of cut-off wheels. As shown in FIG. 3, this apparatus utilizes two abrasive tapes 6 and 7 travelling across a cut-out 8 which is formed in the head portion 9 of the apparatus. In the cut-out 8, the abrasive tapes 6 and 7 extend in directions crossing each other so that tapes 6 and 7 are able to contact respectively the opposite side surfaces 10 and 11 of the cutting edge 2 of a cut-off wheel W. However, the head portion 9 is movable merely in a direction parallel to the cut-off wheel W, and thus it is not easy for the head portion to bring the alternative of the two tapes 6 and 7 into contact with the cutting edge 2.

SUMMARY OF THE INVENTION

Accordingly, it is an object of the present invention to provide a dressing apparatus which is capable of applying a dressing to either of the opposite surfaces of the cut-off wheel's cutting edge without causing one of the opposite surfaces of the cutting edge to contact grinding means such as a grinding wheel.

Another object of the present invention is to provide a dressing apparatus which helps the cutting edge of the cut-off wheel in effectively preventing damage during the dressing treatment.

A further object of the present invention is to provide a method of and a apparatus for applying a dressing to the cutting edge of a cut-off wheel, which makes it possible to adjust the level of a dressing to be applied to the cutting edge of a cut-off wheel.

With these and other objects in view, one aspect of the present invention is directed to a dressing apparatus which includes: fixing means detachably mounted on a cutting machine on which a cut-off wheel is mounted so as to be rotated about the axis thereof; a first body connected to the fixing means and extending generally parallel to the axis of the cut-off wheel, the first body having a slider member slidable along the longitudinal axis of the first body; a second body slidably connected to the slider member of the first body for movement in a direction generally perpendicular to both the axis of the cut-off wheel and the longitudinal axis of the first body; a head member connected to the second body and disposed generally perpendicularly to a plane in which the cut-off wheel lies; first drive means, mounted on the head member, for rotating a pair of grinding wheels which are connected to the head member for rotation about respective parallel axes generally perpendicular to a plane parallel to both the axis of the cut-off wheel and the longitudinal axis of the first body, the axes of the grinding wheels being disposed so that a line perpendicular to both of the axes of the grinding wheels is parallel to the longitudinal axis of the first body; means for urging the slider member toward an initial position thereof and for thereby normally retaining the slider member in its initial position; and second drive means, interposed between the first and second body, for moving the second body with respect to the first body. The second drive means includes: a cylinder actuator for moving the slider member from its initial position in either of the opposite directions; and means for causing the second body to move in a direction relative to the slider member simultaneously with the movement of the first slider member from its initial position in either of the opposite direction. After setting the grinding wheels at positions opposite hand sides of the cutting edge of the cut-off wheel, the cylinder actuator is operated, which causes either of the grinding wheels to contact one of the opposite surfaces of the peripheral cutting edge of the cut-off wheel to apply a dressing to the peripheral cutting edge.

It is preferred that the head member is pivotally connected to the second body for movement about an axis parallel to the axes of the grinding wheels. The second body may have stopper means for restricting the pivotal movement of the head member toward the cutting edge of the cut-off wheel to its initial position in which a line perpendicular to both of the axes of the grinding wheels is generally parallel to the longitudinal axis of the first body. The second body may also have biasing means for urging the head member toward the cutting edge of the cut-off wheel and into its initial position. Each of the grinding wheels may be composed of numerous abrasive grains bound together by a resilient bond material. During the dressing treatment and upon the contact of the grinding wheel with the cutting edge of the cut-off wheel, the biasing means and the elastic grinding wheels dampen the impact force exerted on both the grinding wheel and the cutting edge of the cut-off wheel. Therefore, the cutting edge of the cut-off wheel as well as the grinding wheel is helped in preventing damage.

Another aspect of the present invention is directed to a dressing method using a grinding wheel. At least one of both the grinding wheel and a cut-off wheel is rotated about the axis thereof. Then, the grinding wheel is brought into contact with the peripheral cutting edge of the cut-off wheel in such a manner that the axis of the grinding wheel is inclined, at an angle larger than 0° and smaller than 90°, to the axis of the cut-off wheel when the axes of the grinding and cut-off wheels are viewed from a plane of projection perpendicular to the direction in which the grinding wheel and the cut-off wheel are aligned. As the angle between the axes of the grinding and cut-off wheels becomes larger, a greater scraping is caused between the grinding wheel and the cutting edge of the cut-off wheel, and thus a greater dressing is applied to the cutting edge 2.

A further aspect of the present invention is directed to a dressing apparatus for practicing the dressing method described above. This dressing apparatus includes: fixing means detachably mounted on the cutting machine on which a cut-off wheel is mounted; a first body connected to the fixing means and extending generally parallel to the axis of the cut-off wheel; a second body slidably connected to the first body for movement along a plane parallel to both the axis of the cut-off wheel and the longitudinal axis of the first body; a head member pivotally connected to the distal end of the second body for movement about an axis generally perpendicular to both the axis of the cut-off wheel and the longitudinal axis of the first body, the head member having a side face generally parallel to the pivotal axis thereof, the side face intersecting a plane in which the cut-off wheel lies; first drive means, mounted on the head member, for rotating a grinding wheel which is disposed on the head member so as to overlap the side face of the head member, the grinding wheel being connected to the side face of the head member for rotation about an axis generally perpendicular to the side face; and second drive means, interposed between the first and second body, for moving the second body with respect to the first body so that the grinding wheel is brought into contact with the peripheral cutting edge of the cut-off wheel to apply a dressing to the peripheral cutting edge of the cut-off wheel.

BRIEF DESCRIPTION OF THE DRAWINGS

In the drawings:

FIG. 4 is a side-elevational view of a dressing apparatus according to the present invention;

FIG. 14 is a fragmentary side elevational view of a further embodiment of the present invention;

DETAILED DESCRIPTION OF THE PREFERRED EMBODIMENTS

Figure 1:
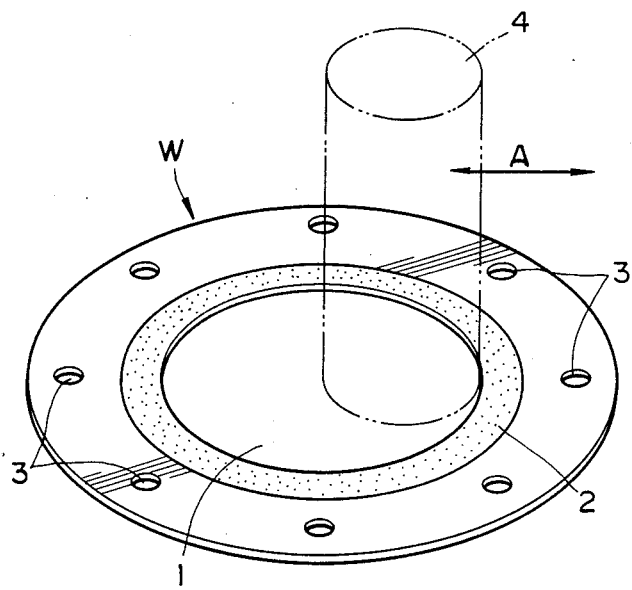
FIG. 1 is a perspective view of a cut-off wheel having a peripheral cutting edge formed along the inner periphery thereof showing a silicon ingot, by phantom line, inserted into the central aperture of the cut-off wheel.
Figure 2:
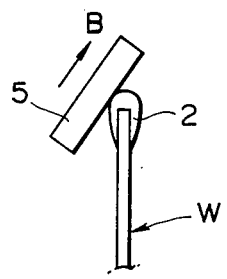
FIG. 2 is a fragmentary side-elevational view of the cut-off wheel which is being applied with a dressing by a abrasive stick.

Referring now to FIGS. 4 to 16, wherein like reference characters designate corresponding parts throughout several views, and descriptions of the corresponding parts are omitted once given.

Figure 5:
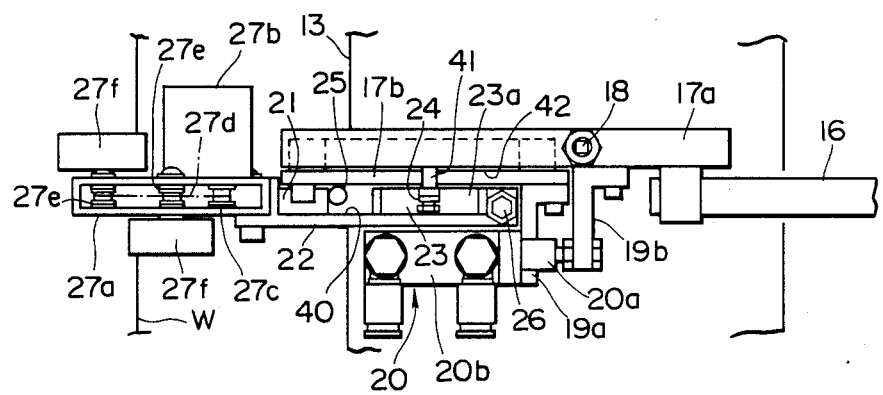
FIG. 5 is a plan view of the dressing apparatus in FIG. 4.

FIGS. 4 and 5 show an embodiment of a dressing apparatus according to the present invention. In FIG. 4, reference numeral 15 designates fixing means in the form of a magnet stand adapted to be detachably fixed to the body of a cutting machine, described later on, to which a cut-off wheel is attached. This magnet stand 15 has a first support rod 14 extending upward therefrom as viewed in FIG. 4. A second support rod 16 is slidably connected at its one end portion to the first support rod 14 for movement along the first support rod 14, and extends substantially horizontally from the first support rod 14. Suitable means such as a thumbscrew and a pair of a wing nut and a screw (not shown) is provided on the connection between the first and second support rods 14 and 16 to restrain the movement of the second support rod 16. A slat-like first body 17a is slidably connected to the second support rod 16 for movement along the second support rod 16, and extends horizontally from the second support rod 16 so as to be parallel to both the first and second support rods 14 and 16. Suitable means such as a thumbscrew (not shown) is also provided on the connection between the first body 17a and the second support rod 16 to restrain the movement of the first body 17a. The first body 17a has a threaded through hole (not shown), formed therein, which extends between upper and lower faces thereof as viewed in FIG. 4. A position-adjusting member in the form of a bolt 18 is screwed in the through hole so as to pass through the first body 17a. A first linear slider in the form of an elongated member 17b (see FIG. 5) is slidably connected to the first body 17a for longitudinal and horizontal movement along the side face of the first body 17a. An air cylinder 20 is interposed between the first body 17a and the first linear slider 17b to horizontally move the first linear slider 17b with respect to the first body 17a. More specifically, the cylinder body 20b of the air cylinder 20 is secured to the right end, as viewed in FIG. 5, of the first linear slider 17b via a bracket 19a, while the plunger 20a of the air cylinder 20 is secured to the first body 17a via a bracket 19b.

Referring to FIG. 5, a second linear slider 21 is slidably connected to the left end of the first linear slider 17b for vertical movement. A plate-like second body 22 is fixed at its left end portion to the second linear slider 21 so that one of its opposite side faces, namely, an inner face 40 confronts the side face 42 of the first body 17a, to which the first linear slider 17b is connected. Between this second body 22 and the first linear slider 17b, there is interposed first urging means in the form of a coil spring 25 for urging the second body upward, as viewed in FIG. 4. To the inner face 40 of the second body 22, a V block-shaped member is attached at one of its opposite sides in such a manner that the V-shaped recess of the V block member 23 opens upward as viewed in FIG. 4. A guide roller 24, which is rotatably supported by a shaft 41 projecting from the side face 42 of the first body 17a, is received in the V-shaped recess of the V block member 23. This guide roller 24 is pressed, by means of the coil spring 25, against the slanting upper face 23a of the V block member 23 so as to roll along the slanting face 23a. That is, when the solenoid valve of the air cylinder 20 is open, the guide roller 24 is kept in the bottom of the V-shaped recess of the V block member 23, resulting in the second body 22 being in its initial position shown in FIGS. 4 and 5. An adjustable stopper means in the form of a vertical screw 26 is threadedly engaged with the second body 22. This screw 26 cooperates with a projection (not shown) disposed on the first body 17a to restrict the downward movement of the second body 22 to a predetermined level. That is to say, when the second body 22 is moved downward to the predetermined level, the lower end of the screw 26 butts against the projection on the first body 17a.

Referring further to FIGS. 4 and 5, a head member 27a is secured to the left end of the second body 22. This head member 27a is of a box-like configuration without the upper and lower end walls, and has a cut-out 44 formed in the lower portion thereof so as to open downward. A driving motor 27b is mounted on one of the side faces of the headmember 27a which is substantially parallel to the second body 22. A driving pulley 27c firmly fits around that portion of the motor's rotation shaft projecting into the inside of the head member 27a. A pair of rotary shafts 46 and 46, each passing through the head member 27a in a direction perpendicular to the second body 22, are disposed at respective positions upper right and left hand sides of the cut-out 44. A pair of elastic grinding wheels 27f and 27f are coaxially connected to the respective rotary shafts 46 and 46 so as to be rotatable with respect to the head member 27a and to cause themselves to overlap the cut-out 44. More specifically, one of the grinding wheels 27f and 27f is fixed to that portion of the left rotary shaft 46 projecting from the side face, on which the motor 27b is mounted, of the head member 27a, whereas the other grinding wheel 27f is fixed to that portion of the right rotary shaft 46 projecting from the other side face of the head member 27a. Each of the grinding wheel is composed of numerous abrasive grains such as diamond grains bound together by a resilient bond made of synthetic resin such as urethane and polyurethane. Each of the rotary shafts 46 has a driven pulley 27e firmly fitting therearound. The driven pulley 27e of each rotary shaft 46 is operatively connected to the drive pulley 27c via a belt or wire 27d.

The operation of the dressing apparatus thus arranged will now be described.

At the outset, the dressing apparatus is mounted on the cutting machine 13 having a cut-off wheel W which should be applied with a dressing treatment. As shown in FIG. 4, the cutting machine 13 includes, for example, an air bearing consisting of a hollow cylindrical inner member 48 and ring-shaped outer member 49 coaxially disposed on the inner member so as to be rotated at a high speed about its axis. The outer member 49 has a ring-shaped clamp member (not shown) coaxially fastening the outer peripheral portion of the cut-off wheel W to the outer member 49.

The mounting of the dressing apparatus is performed as follows. As shown in FIG. 4, the head member 27a of the dressing apparatus is inserted into the aperture 1 of the cut-off wheel W. Then, the magnet stand 15 is fixed to the end face of the inner member 48 of the cutting machine 13 so that the cut-out 44 of the head member 27a faces the inner peripheral cutting edge 2 of the cut-off wheel W and the grinding wheels 27f and 27f are disposed adjacent, respectively, to the opposite side surfaces of the cutting edge 2. The bolt 26 is turned to adjust the distance between the cutting edge 2 and the grinding wheels 27f and 27f. In this state, the solenoid valve of the air cylinder 20 is open, and thereby the second body 22 is in its initial position where the guide roller 24 stays at the bottom of the V-shaped recess of the V block member 23.

The cut-off wheel W is rotated by the cutting machine, and then, the drive motor 27b is turned on, to rotate the grinding wheels 27f and 27f. Next, the air cylinder 20 is actuated to cause either of the grinding wheels 27f and 27f to contact the cutting edge 2 of the cut-off wheel W. For example, as viewed in FIG. 4, when the right side surface of the cutting edge 2 of the cut-off wheel W should be dressed, the air cylinder 20 is extended, causing to move to the left, the first linear slider 17b, together with the second body 22. As the second body 22 is moved to the left, it is also moved downward under the guidance of the guide roller 24. More specifically, when the second body 22 is moved to the left, the guide roller 24 rolls up the slanting upper face of the V block member 23, resulting in the obliquely downward movement of the head member 27a. Consequently, the cutting edge 2 of the cut-off wheel is received in the cut-out 44 of the head member 27a, and the right grinding wheel 27f is brought into contact with the right side surface of the cutting edge 2, resulting in the application of a dressing to the same surface of the cutting edge 2. On the other hand, when the left side surface of the cutting edge 2 should be dressed, the air cylinder 20 is retracted, causing the head member 27a to move to the right and also downward under the guidance of the guide roller 24. This oblique movement of the head member 27a results in the contact of the left grinding wheel 27f with the left side surface of the cutting edge 2 of the cut-off wheel W, and thereby the same surface of the cutting edge 2 is applied with a dressing. That is, it is possible in this dressing apparatus to selectively apply a dressing to either of the opposite surfaces of the cutting edge 2.

Figure 6:
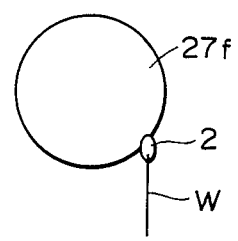
FIG. 6 is a schematic view showing an elastic grinding wheel in FIG. 4, in contact with a peripheral edge of a cutting wheel.
Figure 3:
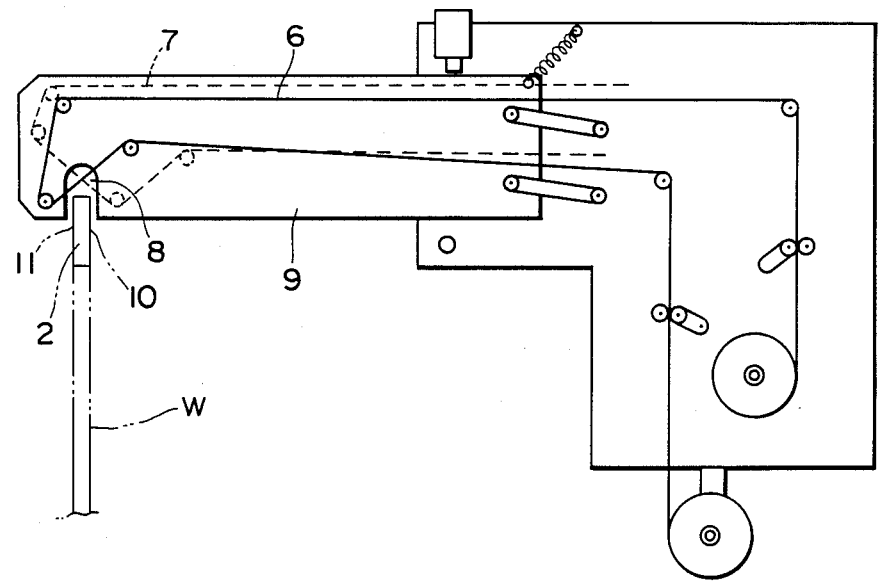
FIG. 3 is a side-elevational view of a conventional dressing apparatus.
Figure 7:
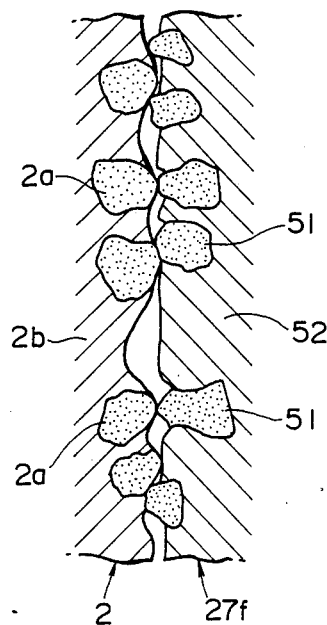
FIG. 7 is a fragmentary cross-sectional view of both the grinding wheel and the cutting edge of the cut off wheel which are in contact with each other to apply a dressing to the cutting edge.
Figure 8:
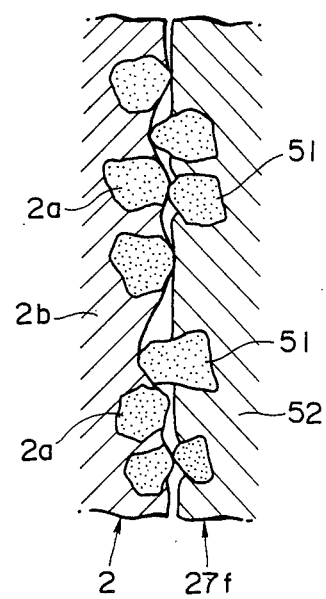
FIG. 8 is a fragmentary cross-sectional view similar to FIG. 7.

Upon the dressing, since the bond used in the grinding wheels 27f and 27f is made of a resilient synthetic resin, either of the grinding wheels 27f and 27f deforms in such a manner that it contact both of the peripheral surface and one of the opposite side surfaces of the cutting edge 2 as shown in FIG. 6. Therefore, it is possible to simultaneously apply a dressing to both the peripheral and one of the opposite side surfaces of the cutting edge 2. Also, when the protruding abrasive grains 51, as shown in FIG. 7, of the grinding wheel 27f come into collision with the abrasive grains 2a of the cutting edge 2, the abrasive grains 51 retract in the resilient bond 52 and thereby the impact force due to the collision is dampened. Hence, these elastic wheels 27f and 27f help the cutting edge 2 in the preventing damage such that the abrasive grains unnecessarily fall off the cutting edge even though the wheels 27f and 27f are pressed against the cutting edge 2 with an excess pressing force. Furthermore, when the abrasive grains 51 pass the abrasive grains 2a of the cutting edge 2, they protrude, again, from the surface of the bond 52 due to the resiliency of the bond 52 as shown in FIG. 8, and scrape the bond 2b among the abrasive grains 2a off the cutting edge 2. Accordingly, it is possible with this dressing apparatus to apply an efficient dressing treatment to the cut-off wheel by causing the grinding wheels 27f and 27f to directly contact the cutting edge 2.

Figure 9:
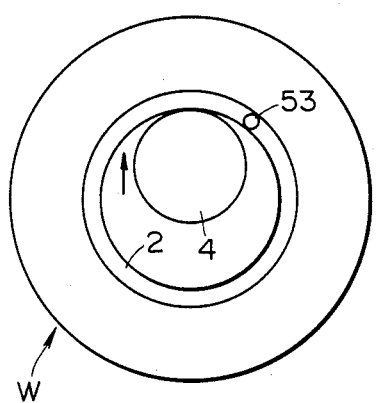
FIG. 9 is a plan view of the cut-off wheel in which a silicon ingot is inserted, showing the position of the displacement detecting sensor relative to the cut-off wheel.
Figure 10:
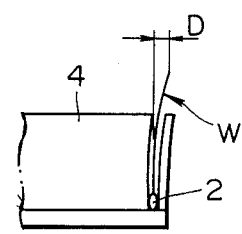
FIG. 10 is a side elevational view of the silicon ingot which is being cut into a slice by the cut-off wheel.

A displacement detecting sensor 53 which is disposed closely adjacent to the inner peripheral cutting edge 2 of the cut-off wheel W as shown in FIG. 9, may be mounted on the cutting machine 13 of the foregoing embodiment to detect a displacement of the cutting edge 2. This displacement detecting sensor 53 is such that it measures a displacement D, shown in FIG. 10, of one of the opposite side surfaces of the cutting edge 2 which is cutting the silicon ingot 4, and supplies a signal representative of the measured displacement to a controller (not shown). The controller estimates a displacement, at the center of the silicon ingot 4, of the corresponding side surface of the cutting edge 2 on the basis of the measured displacement D and the data previously obtained through experiments utilizing a displacement measuring instrument such as one having three-point contact balls, and compares the estimated displacement with a preset value to determine a proper time to apply a dressing to the cutting edge 2. That is to say, if the estimated displacement of the cutting edge 2 exceed the preset value, the controller judges that one of the opposite side surfaces of the cutting edge 2 is dull, and operates the drive motor 27b and the air cylinder 20 to apply a dressing to the suitable side surface of the cut-off wheel W.

Figure 11:
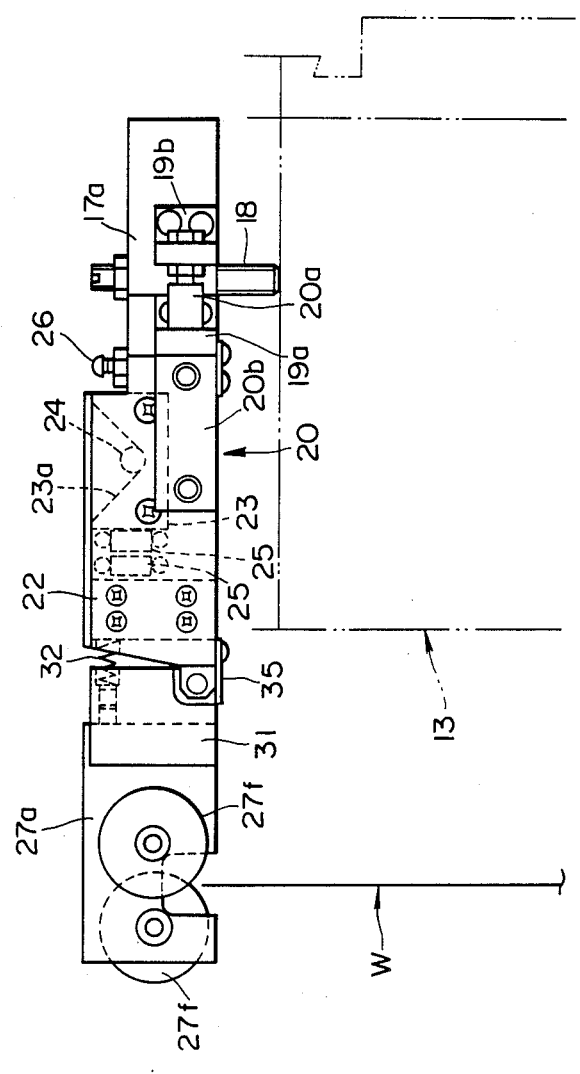
FIG. 11 is a fragmentary side-elevational view of another embodiment of the present invention.
Figure 12:
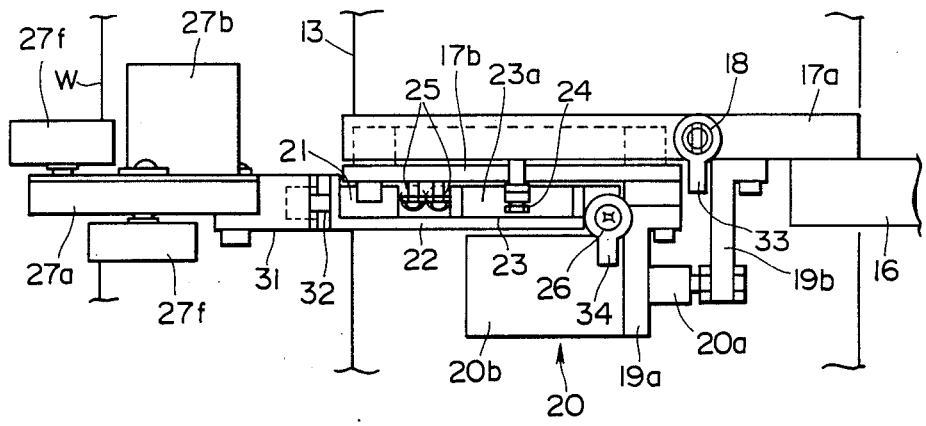
FIG. 12 is a plan view of the dressing apparatus in FIG. 11.

FIGS. 11 and 12 illustrate another embodiment of the dressing apparatus in accordance with the present invention. In this embodiment, a connecting member 31 of a substantially rectangular block-like configuration is interposed between the head member 27a and the second body 22. The left edge portion of the connecting member 31 is secured to the right end portion of the head member 27a, while the lower right edge portion of the connecting member 31 is pivotally connected to the lower left end portion of the second body 22 for upward movement. A stopper plate piece 35 extends horizontally from the second body along the lower edge of the connecting member 31 to normally retain the head member 27a extending parallel to the second body 22 as shown in FIG. 11 and to prevent the head member 27a from pivoting downward. Second urging means in the form of a coil spring 32 is interposed between the upper right edge portion of the connecting member 31 and the upper left end portion of the second body 22 so as to allow the head member 27a to pivot upward when the head member 27a is subjected to an external force directed upward and exceeding a predetermined value. Reference numerals 33 and 34 designate control levers which are attached to the bolt 18 and the screw 26 respectively for the convenience of the turning operation of the respective bolt 18 and screw 26. When either of the grinding wheels 27f and 27f is brought into contact with the cutting edge 2 of a cut-off wheel, an impact force applied to both the grinding wheel 27f and the cutting edge 2 is dampened by the coil spring 32, and moreover, the pressing force with which the grinding wheel 27f contacts the cutting edge 2 does not exceed the elastic force of the coil spring 32. Accordingly, both the cutting edge 2 of the cut-off wheel W and the grinding wheels 27f and 27f are protected from being damaged, and thus the service lives of both the cut-off wheel W and the grinding wheel are lengthened.

Figure 15:
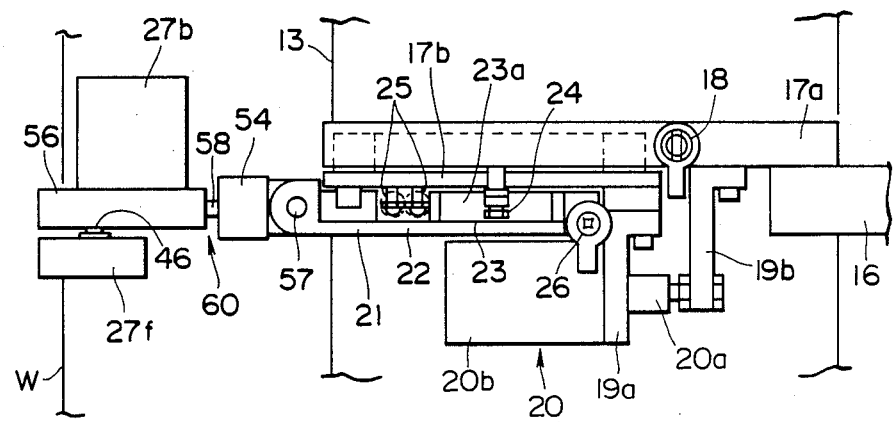
FIG. 15 is a fragmentary plan view of the dressing apparatus in FIG. 14.
Figure 13:
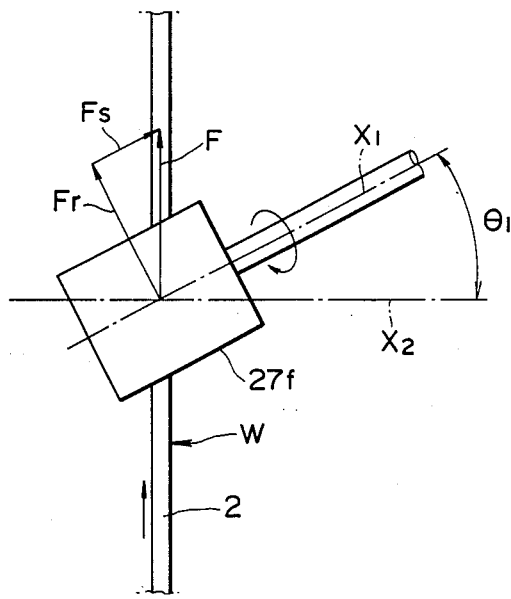
FIG. 13 is a fragmentary plan view of both the grinding wheel and the cut-off wheel, showing an angular relationship between the axes of the respective grinding and cut-off wheels.
Figure 16:
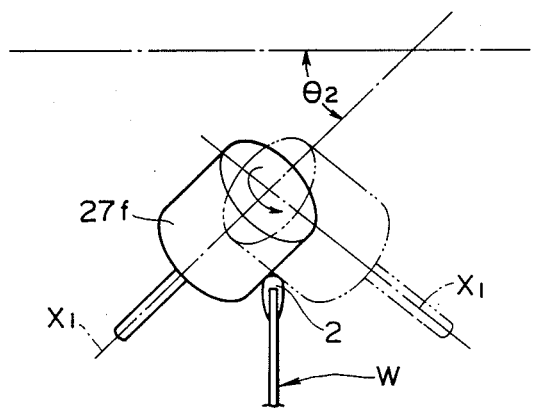
FIG. 16 is a fragmentary side-elevational view of both the grinding wheel and the cut-off wheel, showing an angular relationship between the axes of the respective grinding and cut-off wheels.

In the foregoing embodiments, the dressing treatment is applied in such a state that the axis of either of the grinding wheels 27f and 27f is perpendicular to the axis of the cut-off wheel W when it is viewed from a plane of projection perpendicular to the direction in which the grinding wheel 27f and cut-off wheel W are alined. However, as shown in FIG. 13, the axes $X_1$ and $X_2$ of both the cut-off wheel W and the grinding wheel 27f may be inclined at an angle smaller than 90° to each other when they are viewed from the aforementioned plane of projection. FIGS. 14 and 15 illustrate a further embodiment of a dressing apparatus, which is able to achieve such an angular relationship between the axes of the respective grinding and cut-off wheels. In FIGS. 14 and 15, the head member 60 is pivotally connected via a pivot 57 to the second body 22 for movement about a vertical axis, i.e., an axis parallel to the first rod. Suitable fastening means such as a thumbscrew (not shown) is provided on the connection between the head member 60 and the second body 22 to restrain the pivotal movement of the head member 60. That is, by pivoting the head member 60 with respect to the second body 22, it is possible to cause the axes of the grinding wheel 27f to incline at a desired angle to the axis of the cut-off wheel W. Furthermore, as shown in FIG. 16, the axes $X_1$ and $X_2$ of the respective grinding and cut-off wheels 27f and W may be inclined at an angle $\theta_2$ to each other when they are viewed from a plane of projection parallel to both the axis $X_2$ of the cut-off wheel W and the direction in which the grinding wheel 27f and the cut-off wheel W are aligned. To practice such an inclination, the head member 60 in this embodiment is connected to the second body 22 for rotation about a horizontal axis perpendicular to the rotary shaft 46. More specifically, as shown in FIGS. 14 and 15, the head member's first portion in the form of a block 54 of a suitable configuration is pivotally connected to the left end of the second body 22 for movement about the pivot 57, and the head member's second portion 56 is connected to the first portion 54 via shaft 58 for rotation about a horizontal axis perpendicular to the rotary shaft 46. Suitable means such as a thumbscrew (not shown) is also provided on the connection between the first and second portions 54 and 56 of the head member 27a.

An embodiment of a dressing method in accordance with the present invention which utilizes the dressing apparatus of the third embodiment arranged as disclosed above will now be described.

The grinding wheel 27f is brought into contact with the cutting edge 2 of the cut-off wheel in the state as shown in FIG. 13. That is, in FIG. 13, the grinding wheel 27f and the cut-off wheel W are aligned in a direction perpendicular to the surface of the drawing paper, and the axis $X_1$ of the grinding wheel 27f is inclined at an angle $\theta_1$ to the axis $X_2$ of the cut-off wheel W. The angle $\theta_1$ is larger than 0° and smaller than 90°. Needless to say, both the grinding wheel 27f and the cut-off wheel W are restrained so as not to be axially movable. When the cut-off wheel W is driven to rotate about its axis $X_2$, a component Fr, which is directed perpendicularly to the axis $X_1$ of the grinding wheel 27f, of the torque F of the cut-off wheel W is transmitted to the grinding wheel 27f, resulting in the rotation of the grinding wheel 27f. On the other hand, a component Fs, which is directed parallel to the axis $X_1$ of the grinding wheel 27f, of the torque F causes a scraping between the grinding wheel 27f and the cut-off wheel W, thereby a dressing is applied to the cutting edge 2 of the cut-off wheel W. When the angle $\theta_1$ is 0°, the component Fs causing the scraping is not generated. As the angle $\theta_1$ becomes larger, a greater scraping is caused, and thus a greater dressing is applied to the cutting edge 2. In other words, it is possible to control the level of a dressing treatment by adjusting the angle $\theta_1$ between the axes of the grinding wheel 27f and the cut-off wheel W. In addition, it should be readily apparent that the grinding wheel 27f may be driven instead of the cut-off wheel W, and otherwise both the cut-off wheel W and the grinding wheel 27f may be driven.

Although in the foregoing embodiments, the dressing apparatus and the dressing method is utilized for applying a dressing to the inner peripheral cutting edge of a cut-off wheel, it should be readily apparent that they may be utilized for a cut-off wheel which has an outer peripheral cutting edge requiring an application of a dressing. A pair of a guide roller connected to the second body and an inverted V block-shaped member connected to the first body 17a may be employed instead of the pair of the guide roller 24 and the V block member 23 of the foregoing embodiments.

What is claimed is:

1. A method of applying a dressing, by using a rotary grinding wheel, to a peripheral cutting edge of abrasive grain formed on either an outer periphery or an inner periphery of a disc-shaped rotary cut-off wheel, the dressing method comprising the steps of: rotating both the grinding wheel and the cut-off wheel about their respective axes; bringing the grinding wheel into contact with the peripheral cutting edge of the cut-off wheel in such a manner that the axis of the grinding wheel is inclined, at an angle larger than 0° and smaller than 90°, to the axis of the cut-off wheel, when the axes of the grinding and cut-off wheels are viewed from a plane of projection perpendicular to the direction in which the grinding wheel and the cut-off wheel are aligned, said step of bringing the grinding wheel into contact with the peripheral cutting edge of the cut-off wheel including pressing the grinding wheel against the peripheral cutting edge by means of a spring so that the pressing force with which the grinding wheel contacts the cutting edge is adjusted to a level not greater than the elastic force of the spring, before the step of bringing the grinding wheel into contact with the peripheral cutting edge of the cut-off wheel, positioning the grinding wheel and a second rotary grinding wheel respectively at opposite sides of the cutting edge of the cut-off wheel, and wherein after positioning said grinding wheels, the step of bringing the grinding wheel into contact with the peripheral cutting edge of the cut-off wheel further includes moving both grinding wheels selectively along the axis of the cut-off wheel until one of the grinding wheels contacts one of the opposite side surfaces of the cutting edge, such that either of the opposite side surfaces of the cutting edge is selectively applied with a dressing.

2. A dressing method according to claim 1, wherein the axis of the grinding wheel is inclined at an angle less than 90° to the axis of the cut-off wheel when the axes are viewed from a plane of projection parallel to both the axis of the cut-off wheel and the direction in which the grinding and cut-off wheels are aligned.

3. A method of applying a dressing according to claim 1, wherein each of the grinding wheels comprises numerous abrasive grains bound together by a resilient bond material.

4. A dressing method according to claim 3, wherein the axis of the grinding wheel is inclined at an angle less than 90° to the axis of the cut-off wheel when the axes are viewed from a plane of projection parallel to both the axis of the cut-off wheel and the direction in which the grinding and cut-off wheels are aligned.

5. A method of applying a dressing, by use of a dressing apparatus, to a peripheral cutting edge of abrasive grain formed on either an outer periphery or an inner periphery of a disc-shaped cut-off wheel which is mounted on a dressing machine so as to be rotated about the axis thereof, the dressing apparatus including: fixing means detachably mounted on the cutting machine; a first body connected to the fixing means and extending generally parallel to the axis of the cut-off wheel; a slider member connected to the first body for movement along the longitudinal axis of the first member; a second body slidably connected to the slider member for movement in a direction perpendicularly intersecting both the axis of the cut-off wheel and the longitudinal axis of the first body, the second body having a proximal end and a distal end such that the distance between the distal end and the fixing means is longer than the distance between the proximal end and the fixing means; a head member pivotally connected to the distal end of the second body for movement about a pivotal axis perpendicular to a plane including both the axis of the cut-off wheel and the longitudinal axis of the first body, the head member being disposed generally perpendicularly to a plane in which the cut-off wheel lies; a pair of grinding wheels connected to the head member for rotation about respective parallel axes parallel to the pivotal axis of the head member; a spring member interposed between the head member and the second body and urging the head member toward the cutting edge of the cut-off wheel; first drive means for rotating the grinding wheels; and second drive means for moving the second body with respect to the first body so that the grinding wheels are brought into contact with the peripheral cutting edge of the cut-off wheel; said dressing method comprising the steps of:

rotating both the cut-off wheel and the grinding wheels; and until at least one of the grinding wheels contacts the cutting edge of the cut-off wheel, moving the second body in a direction opposite to the direction in which the head member is pivotally movable against the opposing elastic force of the spring member, whereby, upon contact, an impact force applied to both the cutting edge and the contacting grinding wheel is dampened and the pressing force with which the grinding wheel contacts the cutting edge is adjusted to a level not greater than the elastic force of the spring member.

6. A method of applying a dressing according to claim 6, further comprising the steps of, before said moving step, positioning the grinding wheels respectively at the opposite sides of the cut-off wheel wherein said moving step includes moving the second body in either of the opposite directions selectively, along the longitudinal axis of the first body so that one of the grinding wheels can contact one of the opposite side surfaces of the cutting edge, such that either of the opposite side surfaces of the cutting edge is selectively applied with a dressing.

\* \* \* \* \*